(12) United States Patent
King et al.

(10) Patent No.: US 6,721,076 B2
(45) Date of Patent: Apr. 13, 2004

(54) SYSTEM AND METHOD FOR REFLECTIVE HOLOGRAPHIC STORAGE WITH ASSOCIATED MULTIPLEXING TECHNIQUES

(75) Inventors: Brian King, Worcester, MA (US); Ken Anderson, Boulder, CO (US); Kevin Curtis, Longmont, CO (US)

(73) Assignee: InPhase Technologies, Inc., Longmont, CO (US)

(*) Notice: Subject to any disclaimer, the term of this patent is extended or adjusted under 35 U.S.C. 154(b) by 0 days.

(21) Appl. No.: 10/210,251

(22) Filed: Jul. 31, 2002

(65) Prior Publication Data

US 2003/0039001 A1 Feb. 27, 2003

Related U.S. Application Data

(60) Provisional application No. 60/310,301, filed on Aug. 3, 2001, and provisional application No. 60/315,273, filed on Aug. 27, 2001.

(51) Int. Cl.[7] .................................................. G03H 1/04
(52) U.S. Cl. ............................ 359/35; 359/10; 359/24; 359/25; 430/1; 365/125
(58) Field of Search ........................... 359/10–11, 22, 359/24–25, 35, 1, 3; 365/125, 216, 234; 430/1–2

(56) References Cited

U.S. PATENT DOCUMENTS

| | | |
|---|---|---|
| 3,417,454 A | 12/1968 | Beasley |
| 3,631,411 A | 12/1971 | Kosonocky |
| 3,905,778 A | 9/1975 | Pearson |
| 3,932,148 A | 1/1976 | Krewalk, Sr. |
| 4,183,545 A | 1/1980 | Daly |
| 4,220,491 A | 9/1980 | Metcalf et al. |
| 4,470,856 A | 9/1984 | Little et al. |
| 4,506,184 A | 3/1985 | Siddall |

(List continued on next page.)

FOREIGN PATENT DOCUMENTS

| | | |
|---|---|---|
| EP | 0 683 511 B1 | 11/1995 |
| WO | WO 95/11521 | 4/1995 |
| WO | WO 03/018309 | 3/2003 |

OTHER PUBLICATIONS

IBM Technical Disclosure Bulletin (Oct. 1989). "Device for planarizing structured surfaces," vol. 32, No. 5A, pp. 402–403.

(List continued on next page.)

*Primary Examiner*—Drew Dunn
*Assistant Examiner*—Leo Boutsikaris
(74) *Attorney, Agent, or Firm*—Morrison & Foerster LLP

(57) ABSTRACT

A method and system of recording successive holograms in a recording medium including a reflective substrate layer, a polarization shifting layer, and a photorecording medium layer is presented. A reference beam and an object beam are propagated at a first direction to a first area of the photorecording medium layer, where the reference beam and object beam have a same first polarization and interfere to produce a first interference grating. The reference beam and object beam are reflected with the reflective substrate layer to be incident the photorecording medium at a second direction, where the reference beam polarization and object beam polarization are altered with the polarization shifting layer to have a same second polarization. The reflected reference beam and object beam interfere to produce second interference grating, with the first polarization and second polarization being different.

43 Claims, 7 Drawing Sheets

U.S. PATENT DOCUMENTS

| | | | |
|---|---|---|---|
| 4,537,827 A | 8/1985 | Little et al. | |
| 4,579,616 A | 4/1986 | Windischmann et al. | |
| 4,737,824 A | 4/1988 | Sakai et al. | |
| 5,054,683 A | 10/1991 | Haisma et al. | |
| 5,131,968 A | 7/1992 | Wells et al. | |
| 5,160,560 A | 11/1992 | Welkowsky et al. | |
| 5,326,420 A | 7/1994 | Vinouze et al. | |
| 5,327,266 A * | 7/1994 | Mulder | 359/24 |
| 5,433,911 A | 7/1995 | Ozimek et al. | |
| 5,515,167 A | 5/1996 | Ledger et al. | |
| 5,670,009 A | 9/1997 | Tarn et al. | |
| 5,760,864 A | 6/1998 | Yamada et al. | |
| 5,795,430 A | 8/1998 | Beeteson et al. | |
| 5,932,045 A | 8/1999 | Campbell et al. | |
| 6,156,415 A | 12/2000 | Campbell et al. | |
| 2002/0071145 A1 * | 6/2002 | Roh | 359/35 |
| 2003/0044577 A1 | 3/2003 | Dhar et al. | |

OTHER PUBLICATIONS

Barbatathis, G and Psaltis, D. (2000). "Volume Holographic Multiplexing Methods," *Holographic Data Storage*, Springer Series in Optical Series, Springer–Verlag, H. J. Coufal et al. (eds.), pp 21–62.

Barbasthathis, G. et al. (1996). "Shift Multiplexing with Spherical Reference Waves," *Applied Optics* 35(14):2403–2417.

Curtis, K. et al., (2000). "High–Density, High–Performance Data Storage via Volume Holography: The Lucent Technologies Hardware Platform," *Holographic Data Storage*, Springer Series in Optical Series, Springer–Verlag, H. J. Coufal et al. (eds.), pp. 359–368.

Dhar, L. et al., (2000). "Photopolymers for digital holographic data storage," *Holographic Data Storage*, Springer Series in Optical Series, Springer–Verlag, H. J. Coufal et al. (eds.), pp. 199–208.

Hesselink, L. and Bashaw, M. C. (1993). "Optical memories implemented with photorefractive media," *Optical and Quantum Electronics* 25:S611–S661.

Hesselink, L. (2000). "Digital Holographic Demonstration Systems by Standford University and Siros Technologies," *Holographic Data Storage*, Springer Series in Optical Series, Springer–Verlag, H. J. Coufal et al. (eds.), pp. 383–397.

Ingwall, R. T. and Waldman, D. (2000). "Photopolymer systems," *Holographic Data Storage*, Springer Series in Optical Series, Springer–Verlag, H. J. Coufal et al. (eds.), pp. 171–197.

Jefferson, C. M. et al., (2000). "IBM Holographic Digital Data Storage Test Platforms," *Holographic Data Storage*, Springer Series in Optical Series, Springer–Verlag, H. J. Coufal et al. (eds.), pp. 369–381.

Mitkas, P. A. and Burr, G. W. (2000). "Volume holographic optical correlators," *Holographic Data Storage*, Springer Series in Optical Series, Springer–Verlag, H. J. Coufal et al. (eds.), pp. 429–444.

Pappu, S. V. (1990). "Holographic memories; a critical review", *Int. Journal of Optoelectronics*, 5(3):251–292.

Pu, A. et al., (1994). "A new method for holographic data storage in photopolymer films", *IEEE/IEOS Symposium*, pp. 433–435.

Psaltis, D. and Mok, F. (Nov. 1995). "Holographic Memories," *Scientific American*, pp. 70–76.

Redfield, S. (2000). "Tamarak optical head holographic storage," *Holographic Data Storage*, Springer Series in Optical Series, Springer–Verlag, H. J. Coufal et al. (eds.), pp. 343–357.

Saito, K. and Horimai, H. (1998) "Holographic 3–D disk using in–line face–to–face recording," *Conference on Optical Data Storage–Topical meeting*, Osa Technical Digest Series, Conference Sponsor: Optical Society of America, IEEE Lasers and Electro–Optics Society SPIE, Conference Location: Aspen, CO, Conference Date: May 1998, pp. 162–164.

Sidney Li H.–Y. and Psaltis, D. (Jun. 10, 1994). "Three–dimensional holographic disks," *Applied Optics*, 33(17):3764–3774.

Van Heerden, P.J. (1963). "Theory of Optical Information Storage in Solids," *Applied Optics* 2(4):393–400.

Zhou, G. et al., (2000). "Beam deflectors and spatial light modulators for holographic storage application," *Holographic Data Storage*, Springer Series in Optical Series, Springer–Verlag, H. J. Coufal et al. (eds.), pp. 241–256.

* cited by examiner

SYSTEM AND METHOD FOR REFLECTIVE HOLOGRAPHIC STORAGE WITH ASSOCIATED MULTIPLEXING TECHNIQUES

CROSS REFERENCE TO RELATED APPLICATIONS

This Application claims the benefit of provisional application 60/310,301, filed Aug. 3, 2001, and provisional application 60/315,273, filed Aug. 27, 2001.

TECHNICAL FIELD

The present invention relates to the general field of holographic storage systems and methods. More specifically the invention relates to a system and method for reflective holographic storage with associated multiplexing techniques.

BACKGROUND

General holographic storage systems are discussed in "Holographic Memories", by Demetri Psaltis et. al., *Scientific American*, November 1995, which is hereby incorporated by reference. Holography is also discussed in the text Holographic Data Storage, by H. J. Coufal, D. Psaltis, and G. T. Sincerbox, Eds., copyright 2000, Springer-Verlag which is hereby incorporated by reference. The basic principles of holography involve the recording of an interference pattern formed between two beams of light, referred to as an object beam and a reference beam. The object beam is encoded with data in a two dimensional pattern. The reference beam is used to form the interference pattern with the encoded object beam and is subsequently used to reconstruct the data by illuminating the recorded pattern.

In a volume holographic storage medium, a large number of holograms can be stored in the same volume region using multiplexing techniques. There are several techniques for multiplexing holograms, including shift multiplexing, angle multiplexing, wavelength multiplexing, correlation multiplexing and phase multiplexing. Volume holography uses a thick recording medium, where the thickness dimension is associated with Bragg selectivity in the movement of the holographic storage medium in shift multiplexing or the angle change in angle multiplexing.

Shift multiplexing is a volume holography method for storing a plurality of images within a single holographic medium. Such shift multiplexing is discussed in "Shift Multiplexing with Spherical Reference Waves", pages 2403–2417, by George Barbastathis et al, *Applied Optics*, Vol. 35, No. 14, May 10, 1996. Shift multiplexing generally involves the high density packing of successive holograms in an x-y array. Overlapping holograms produced by shifting the medium in the grating direction are differentiated by first-order Bragg selectivity.

FIG. 7 illustrates the basic setup of a typical prior art holographic system. The holographic storage system 700 includes a laser light source 710. The coherent light from the laser light source 710 is directed to a beam splitter 715, such as a polarizing beam splitter cube, which splits the light from laser light source 710 into a reference beam 720 and an object beam 725. Reference beam 720 is reflected by a turning mirror 730 to a lens 735. Object beam 725 is directed to a turning mirror 745 which directs the object beam to a Spatial Pattern Encoder 755, which encodes the object beam with data (an image). The object beam is then directed to a holographic storage media 750 with lens 780. Pattern encoder 755 may be a spatial light modulator ("SLM"), or any device capable of encoding the object beam, such as a fixed mask, or other page composer. The encoded object beam 725 is then directed to lens 780 that focuses the encoded object beam 725 to a particular site on the holographic storage media 750. Successive overlapping holograms may be recorded in a shift multiplex system by translating the holographic storage media 750 in a shift multiplex direction 788.

During readout of holograms previously stored in the holographic storage media 750, object beam 725 is blocked from transmission and a reference beam is projected at the same angle to the same spot on the holographic storage medium on which the desired information was previously stored. Diffraction of the reference beam with the previously stored hologram generates a reconstruction beam 782 that reconstructs the previously stored hologram. The reconstructed beam is transmitted towards imaging lens 784 that directs and images the reconstruction beam onto the plane of the optical detector 786. Optical detector 786 may be a conventional photodiode array, charge coupled device or other suitable detector array that transforms the encoded page into digitized data. In the prior art holographic storage system 700, spatial light modulator 755 and detector 786 are on opposite sides of holographic storage media 750. Lens 780 and lens 784 are also on opposite sides of holographic storage media 750, and are required to image the encoded object beam 725 onto the holographic storage media 750 and image the reconstruction beam 782 onto the detector 786, respectively. Lens 735 is required to image the reference beam 735 onto the holographic storage media 750.

Another prior art holographic system is described in "Holographic 3-D Disk using In-line Face-to-Face Recording", by Kimihiro Saito and Hideyoshi Horimai. The system described utilizes a photosensitive layer with a reflecting unit underneath. A reference beam passes through a first region of the media downward and a second region upwards. The direction of the information beam is opposite to that of the reference beam. Intersection between the reference beam and information beam results in a reflection type hologram. Shift multiplexing can be utilized for multiple recording.

Angle multiplexing is a volume holography method for storing a plurality of images within a single photorefractive medium. Such angle multiplexing is discussed, for example, in "Holographic Memories", by Demetri Psaltis et. al., *Scientific American*, November 1995, and by P. J. van Heerden in, "Theory of Optical Information Storage In Solids," *Applied Optics*, Vol. 2, No. 4, page 393 (1963). A typical system employing angle mutiplexing described in Holographic Data Storage, by H. J. Coufal, D. Psaltis, and G. T. Sincerbox, Eds., pages 343–397, copyright 2000, Springer-Verlag. Angle multiplexing generally involves storage of multiple pages of data in the same photorecording medium by altering the angle of the reference beam entering the media during storage of each page while maintaining the position of the object beam. Each hologram is stored in the same volume and is differentiated by Bragg selectivity. Bragg selectivity during angle multiplexing is described in Holographic Data Storage, pages 30–38 by H. J. Coufal, D. Psaltis, and G. T. Sincerbox, Eds., copyright 2000, Springer-Verlag. Any of the recorded holograms can be viewed by illuminating the photorecording medium with a reference beam set at the appropriate angle.

FIG. 8 illustrates a prior art system geometry in which the encoded object beam and the recording reference beam are counterpropagating. Such a system is described in "Volume Holographic Multiplexing Methods", by G. Barbastathis and D. Psaltis, published in Holographic Data Storage, pages 22–59, by H. J. Coufal, D. Psaltis, and G. T. Sincerbox, Eds., copyright 2000, Springer-Verlag, which is expressly incorporated herein by reference. This geometry is often preferred in wavelength multiplexed systems because it maximizes the optical wavelength Bragg selectivity. However, the prior art system requires that the object beam optics 810 and reference beam optics 815 be on different sides of the holographic storage media 820 in order for the beams to be counterpropagating. Thus, the system is not of a compact design since components are required on both sides of the holographic storage media 820.

Although the prior art systems offer the ability to store a large number of holograms within a holographic storage media, there are disadvantages to existing systems. Although providing for storing of multiple overlapping images, shift multiplexing requires a relatively thick recording medium. However, as the thickness of the photopolymer increases, recording of holograms is made difficult both by the absorption of light by the photosensitizer, and by the low viscosity of the photopolymer before exposure. Recording thick polymer holograms is discussed in Holographic Data Storage, pages 172–208, by H. J. Coufal, D. Psaltis, and G. T. Sincerbox, Eds., copyright 2000, Springer-Verlag. In addition, as the recording medium thickness decreases, the further the medium must be shifted prior to recording a successive hologram, reducing hologram storage density. Angular selectivity of the media during angle multiplexing also improves with recording medium thickness. Furthermore, the optics required by prior art systems require several lenses, and require components on both sides of the holographic storage media.

Thus, there has been a need for improvements in the storage of holograms. More specifically, there has been a need for more efficient hologram storage. In addition, there has been a need for more compact and less complex optics systems.

SUMMARY OF THE INVENTION

The present invention provides a solution to the needs described above through a system and method for reflective holographic storage with associated multiplexing techniques.

In a first embodiment of the invention, a method and system of recording successive holograms in a recording medium is presented. The method utilizes a multilayer holographic storage media comprising a reflective substrate layer, a polarization shifting layer disposed above the reflective substrate layer, and a photorecording medium layer disposed above the polarization shifting layer. A reference beam and an encoded object beam are propagated at a first direction to a first area of the photorecording medium layer, where the reference beam and encoded object beam have a same first polarization and interfere to produce a first interference grating. The reference beam and the encoded object beam are altered by the polarization shifting layer and then reflected with the reflective substrate layer to produce a reflected reference beam and reflected encoded object beam incident the photorecording medium at a second direction, where the reference beam polarization and a encoded object beam polarization are again altered with the polarization shifting layer so that the reflected reference beam and reflected encoded object beam have a same second polarization due to passing through the shifting layer twice. The reflected reference beam and reflected encoded object beam interfere to produce a second interference grating, with the first polarization and second polarization being different. Successive holograms are recorded by translating the multilayer holographic storage media or reference and object beam along a shift multiplex direction, where the reference beam and object beam are propagated to successive areas of the photorecording medium.

During reading out of a previously recorded hologram, a probe beam is propagated at an incident direction to the first area of the holographic storage media along the same path as the record reference beam. The probe beam is reflected by the reflective substrate to produce a reconstruction beam. The reconstruction beam is directed away from the holographic storage media along the same propagation path as the record object beam to a polarizing beam splitter and deflected to a detector. A further embodiment of the invention utilizes a phase conjugate probe beam to reconstruct a previously recorded hologram.

A further embodiment of the invention presents a method and system of recording successive holograms in a recording medium. The method utilizes a multilayer holographic storage media comprising a reflective substrate layer, a polarization shifting layer disposed above the reflective substrate layer, and a photorecording medium layer disposed above the polarization shifting layer. A reference beam with a first polarization is propagated at an incident direction to a first area of the photorecording medium layer. The reference beam is reflected by the reflective substrate and the polarization shifting layer introduces a polarization shift of the incident and reflected reference beam. A data encoded object beam with a second polarization is propagated at an incident direction to a first area of the photorecording medium layer. The object beam is reflected by the reflective substrate and the polarization shifting layer introduces a polarization shift between the incident and reflected object beam. The incident reference beam and reflected object beam interfere to produce a first interference grating, and the reflected reference beam and incident object beam interfere to produce a second interference grating. Successive holograms are recorded by translating the multilayer holographic storage media or reference and object beam along a shift multiplex direction, where the reference beam and object beam are propagated to successive areas of the photorecording medium.

An embodiment of the invention presents a further method and system of recording successive holograms in a recording medium. The method utilizes a multilayer holographic storage media comprising a reflective substrate layer, a polarization shifting layer disposed above the reflective substrate layer, and a photorecording medium layer disposed above the polarization shifting layer. The method also utilizes a wave plate ring with a hollow interior. A reference beam is propagated at an incident normal direction through the waveplate ring and through an imaging lens to a first area of the photorecording medium layer, and is reflected by the reflective substrate. A data encoded object beam is propagated from a spatial light modulator through the hollow interior of the waveplate ring at an incident normal direction through the imaging lens to the first area of the photorecording medium layer, and is reflected by the reflective substrate. The object beam and reference beam are reflected in a reflected direction through the photorecording medium layer and transparent substrate. The incident reference beam and incident object beam interfere to produce a first interference grating and the reflected reference beam and reflected object beam interfere to produce a second interference grating, and wherein the first polarization and second polarization are orthogonal so that there is no interference grating between the incident object beam and reflected reference or the incident reference and reflected object beam. Successive holograms are recorded by translating the multilayer holographic storage media or reference and object beam along a shift multiplex direction, wherein the reference beam and object beam are propagated to successive areas of the photorecording medium.

An embodiment of the invention presents a further method of recording a plurality of holograms in a recording medium. The method utilizes a multilayer holographic storage media comprising a reflective substrate layer, a polarization shifting layer disposed above the reflective substrate layer, and a photorecording medium layer disposed above the polarization shifting layer. A reference beam and an encoded object beam are propagated at a first direction to a select area of the photorecording medium layer, wherein the reference beam and encoded object beam have a same first polarization and interfere to produce a first interference grating. The reference beam and the encoded object beam are reflected with the reflective substrate layer to produce a reflected reference beam and reflected encoded object beam incident the photorecording medium at a second direction. The reference beam polarization and a encoded object beam polarization are altered with the polarization shifting layer so that the reflected reference beam and reflected encoded object beam have a same second polarization, wherein the reflected reference beam and the reflected encoded object beam interfere to produce a second interference grating, and wherein the first polarization and second polarization are orthogonal so that there is no interference grating between the incident object beam and reflected reference or the incident reference and reflected object beam. Subsequent holograms are recorded at the select area by varying the incident angle of the reference beam to the select area of the photorecording medium layer.

An embodiment of the invention presents a further method of recording a plurality of holograms in a recording medium. The method utilizes a multilayer holographic storage media comprising a photorecording medium layer disposed above a reflective substrate layer. A reference beam with a first polarization is propagated at an incident direction and incident angle to a select area of the photorecording medium layer, wherein the reference beam is reflected by the reflective substrate. A data encoded object beam with a second polarization is propagated at an incident direction to a select area of the photorecording medium layer, wherein the object beam is reflected by the reflective substrate. The incident reference beam and reflected object beam interfere to produce a first interference grating and the reflected reference beam and incident object beam interfere to produce a second interference grating. Subsequent holograms are recorded at the select area by varying the incident angle of the reference beam to the select area of the photorecording medium layer.

A further embodiment of the invention presents a system for recording and reading out holograms in a recording medium. The system utilizes a multilayer reflective holographic storage media comprising a reflective substrate layer, a polarization shifting layer disposed above the reflective substrate layer, and a photorecording medium layer disposed above the polarization shifting layer. The system further comprises a laser light source for providing a reference beam and an object beam, a rotatable beam deflector for varying the angle of incidence of the reference beam on the photorecording medium layer, a pattern encoder for encoding data on the object beam to produce an encoded object beam, wherein the reference beam and object beam are propagated to the photorecording medium layer during a hologram recording process using associated reference beam and object beam optics, and a detector for receiving a reconstruction beam during a hologram readout process.

DESCRIPTION OF THE DRAWINGS

The features and advantages of the system and method of the present invention will be apparent from the following description in which.

DETAILED DESCRIPTION OF THE PREFERRED EMBODIMENTS

The present invention provides a solution to the needs described above through a system and method for reflective holographic storage with associated multiplexing techniques. The present invention increases the storage capacity of a holographic storage media by increasing the hologram interaction length between an object beam and reference beam for a given recording medium thickness. The present invention simplifies the optics required in holographic storage systems and enables more compact systems in which record and readout optical components are on one of the holographic storage media.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

Figure 1:
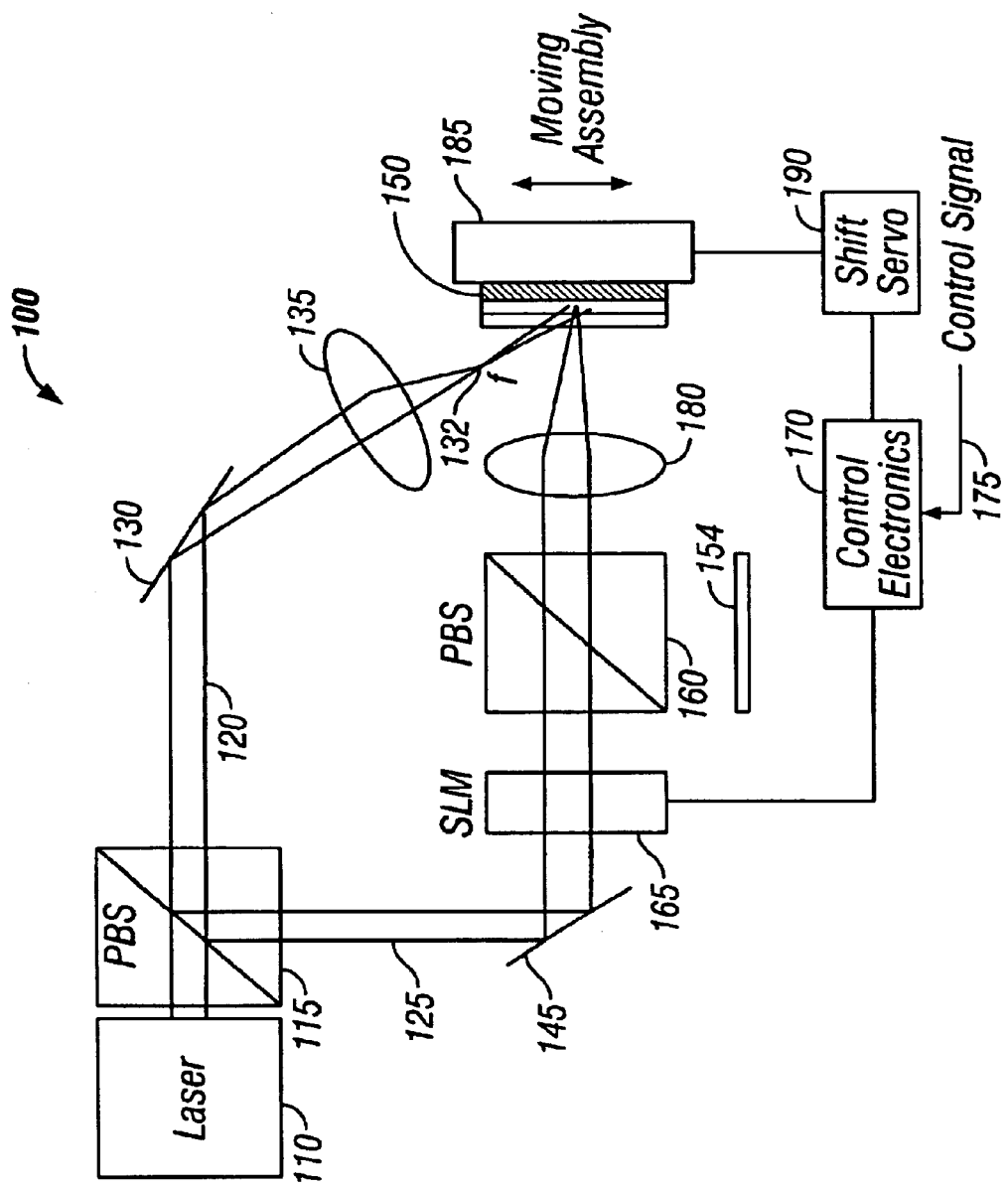
FIG. 1 is a schematic block diagram of an apparatus suitable for use in shift multiplex holography utilizing a reflection holographic storage.

Referring to FIG. 1, a block diagram of a basic configuration utilizing an embodiment of the system for reflective holographic storage using shift multiplexing of the present invention is shown. The holographic storage system 100 of the present invention may be constructed using discrete optical components, such as lasers, lenses and mirrors. The holographic storage system 100 includes a laser light source 110. The coherent light from the laser light source 110 is split into a reference beam and an object beam. The reference beam and object beam are directed to a holographic storage medium where they interfere to record a hologram. Each hologram is often referred to as a "page," and typically comprises a two-dimensional array of data bits. Several pages can be stored at one location on the holographic storage medium utilizing multiplexing techniques.

Light generated by laser light source 110 is directed to a beam splitter 115, such as a polarizing beam splitter cube, which splits the light from laser light source 110 into a reference beam 120 and an object beam 125. Reference beam 120 is reflected by a turning mirror 130 to a lens 135 with focal length F. Object beam 125 is directed to a turning mirror 145 which directs the object beam to a pattern encoder 155, which encodes the object beam with data. The object beam is then directed normal to a reflective holographic storage media 150 with various object beam optics. Following is a description of an exemplary embodiment for encoding and directing the object beam, although other schemes may be used without departing from the intended scope of the present invention.

Object beam 125 is directed to a beam splitter 160, and may pass through one or more lenses prior to reaching beam splitter 160. In the preferred embodiment, beam splitter 160 is a polarizing beam splitter cube. Object beam 125, which was output from polarizing beam splitter cube 115 with polarization in only a horizontal or vertical direction, passes through polarizing beam splitter cube 145 to a pattern encoder 165. A data pattern is then imposed on the object beam 125 by a pattern encoder 165. Pattern encoder 165 may be a spatial light modulator ("SLM"), or any device capable of encoding the object beam, such as a fixed mask, or other page composer. Such pattern encoding is typically amplitude encoding. The pattern encoder 165 receives digitized data from control electronics 170 which receives control signal 175, and imposes that pattern onto the object beam 125, such that the object beam 125 comprises an array of dark and light spots. The encoded object beam 125 is then directed to lens 180 that focuses the encoded object beam 125 to a particular site on the holographic storage media 150. In the preferred embodiment, the holograms are recorded as Fourier Transform holograms. Alternatively, an additional lens can be used in addition to lens 180 to store the holograms as Image plane or Fresnel holograms.

Figure 2A:
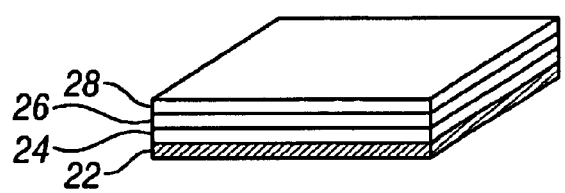
FIG. 2A is an illustrative drawing of a top perspective view of a reflective holographic storage apparatus in accordance with an embodiment of the invention in which a photopolymer layer and quarter wave plate are sandwiched between a first substrate and a second substrate layer, in which the second substrate has a reflective coating.
Figure 2B:
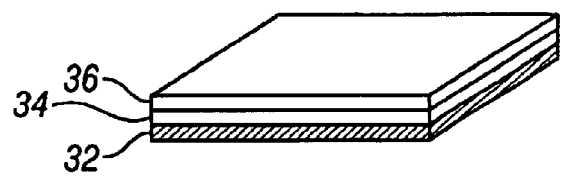
FIG. 2B is an illustrative drawing of a top perspective view of a reflective holographic storage apparatus in accordance with an embodiment of the invention in which a photopolymer layer is sandwiched between a first substrate and a second substrate layer, in which the second substrate has a reflective coating.

Referring to FIG. 2a, an embodiment of the reflective holographic storage media of the present invention is shown. The holographic storage media can be a card, disk, tape, or any other convenient format. The reflective holographic storage media comprises a reflective substrate 22, a quarter wave plate 24, a photopolymer 26, and a protective substrate 28. In a preferred embodiment, reflective substrate 22 may be a glass substrate with a reflective material such as aluminum or gold deposited on the surface adjacent the quarter wave plate. Referring to FIG. 2b, a further embodiment of the reflective holographic storage system of the present invention is shown. The reflective holographic storage system comprises a reflective substrate 32, a photopolymer 34, and a protective substrate 36. The reflective substrate 22 may be a glass substrate with a reflective material such as aluminum or gold deposited on the surface adjacent the quarter wave plate.

The substrates are advantageously selected from glass, sapphire, polycarbonate, plastic, and quartz. Any other material that is transparent to the wavelength being used in the holographic storage system, and which has adequate mechanical properties for a holographic storage system, may also be used as a substrate. The reflective material formed on the substrate between the photopolymer and protective layers may be wavelength dependent, reflecting certain wavelengths of laser light while transmitting others. The reflective layer may be aluminum, gold, copper, or any other suitable material. The reflective material may be deposited on the substrate through vacuum evaporation, vacuum deposition, physical vapor deposition, spin coating, or other suitable technique. The photopolymer layer comprises a vinyl monomer, such as an acrylate or methacrylate ester. Use of photopolymers in holographic storage systems is discussed in Holographic Data Storage, pages 172–208., by H. J. Coufal, D. Psaltis, and G. T. Sincerbox, Eds., copyright 2000, Springer-Verlag.

In alternative embodiments, the holographic storage system may comprise two photopolymer layers. One layer of adherent is located between an outer protective substrate and a reflective substrate. The other layer of adherent is located between a second outer protective substrate and the reflective substrate. Each photopolymer layer is capable of storing data, and thus this embodiment presents a holographic storage with independent holographic data storage in each photopolymer layer. Such two photopolymer layer structures are discussed in co-pending patent application entitled "Method and Apparatus for Multilayer Optical Articles", filed Jan. 11, 2002, inventors Lisa Dhar and David Michaels, application serial number to be assigned, the contents of which are hereby incorporated by reference.

Figure 3:
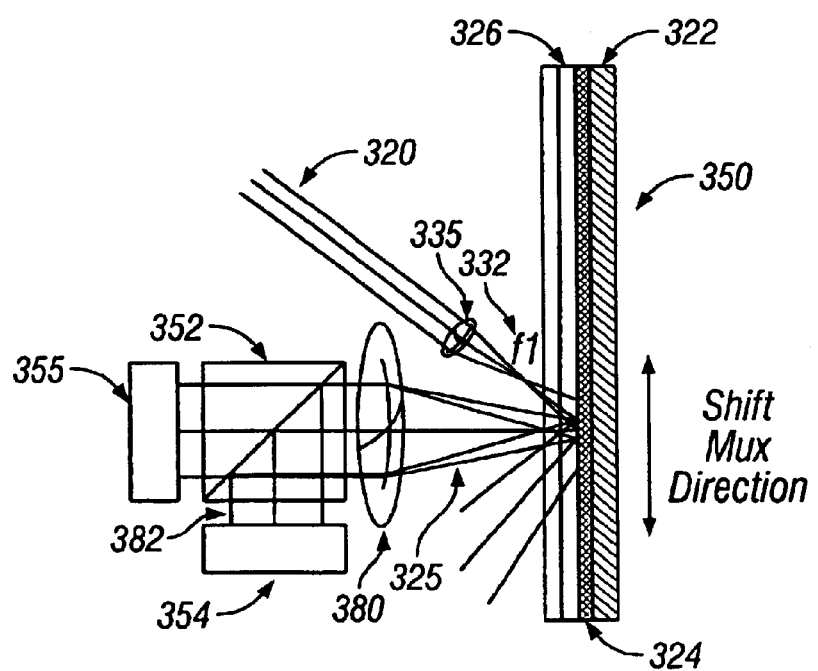
FIG. 3 is an illustrative drawing demonstrating shift multiplexing operation with a reflective holographic storage apparatus in accordance with the invention showing an object beam, reference beam, and read-out beam.

FIG. 3 is an illustrative drawing demonstrating operation of the present invention with a reflective holographic storage apparatus in accordance with the invention showing an object beam, reference beam, and read-out beam. A spherical reference beam is produced by lens 335 from reference beam 320. The lens focus F 332 of spherical lens 335 is at a distance d from the reflective holographic storage media 350, resulting in a spherical reference beam with a divergence angle of incidence in the reflective holographic storage media 350, producing a reference beam spot in the photopolymer layer 326. The spot size of the reference beam was of an area sufficient to cover the encoded object beam spot in the photopolymer layer 326. The encoded object beam is produced with spatial light modulator 355. A fourier transform of the encoded object beam 325 is produced by lens 380. Spatial light modulator 355 and lens 380 are in a 4F configuration, where the spacing between the spatial light modulator 355 and lens 380 is equal to the spacing between lens 380 and the first surface of the reflective layer in the holographic storage media 350, which is equal to the focal distance of lens 380.

Interference between the reference beam and the encoded object beam in the photopolymer layer 326 produces an interference grating, recording a hologram. Both reference beam and encoded object beam propagate through the photopolymer layer 326 at an incident direction and through a quarter wave plate 324 to the reflective substrate 322. At the reflective substrate 322, the reference beam 320 and encoded object beam are reflected back through the quarter wave plate 324 and the photopolymer layer 326 in a reflected direction opposite to the incident direction prior to reflection. The quarter wave plate 324 rotates the polarization of both beams as the beams pass in both the incident and reflected directions, effecting a change in polarization consistent with that of a half-wave plate optic. Interference between the reflected reference beam and reflected encoded object beam in the photopolymer layer 326 records a hologram.

Figure 3A:
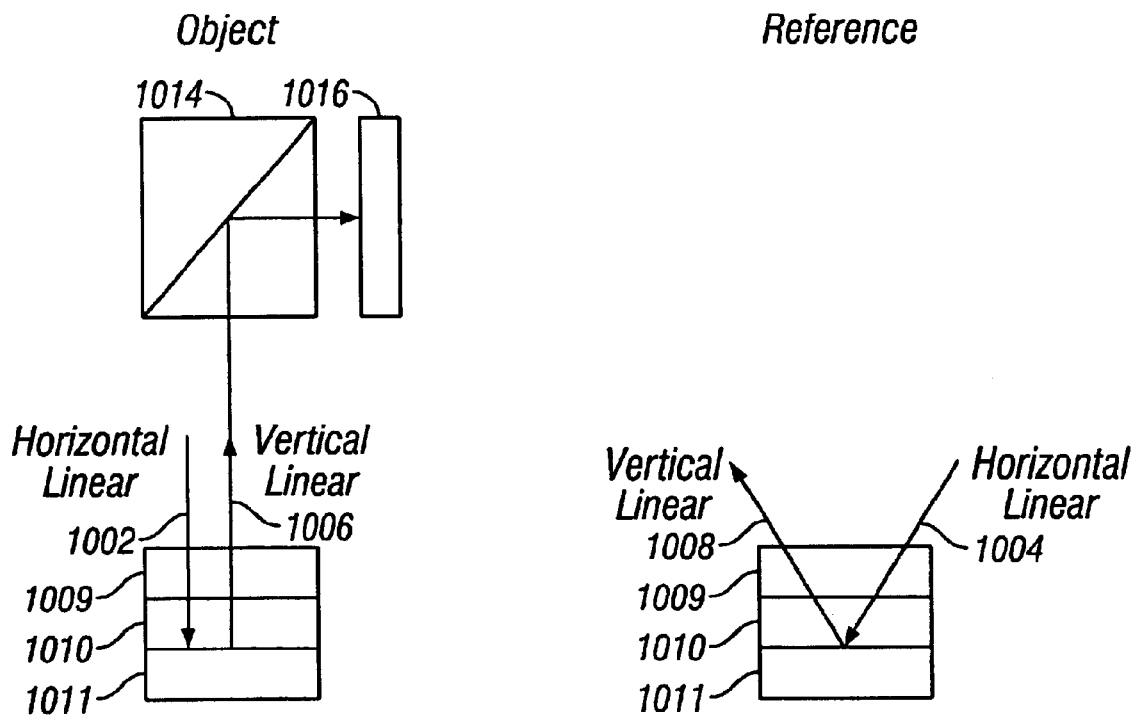
FIG. 3A is an illustrative drawing demonstrating object beam and reference beam linear polarizations during a record process.

In a preferred embodiment, both the reference beam and encoded object beam are of the same polarization so that interference occurs between the object beam and reference beam in both the incident and reflected direction, thereby increasing the length of the interference grating between the reference and object beam for a given photopolymer material layer thickness relative to a non-reflective holographic storage system with a comparable photopolymer layer thickness. Interference does not occur between beams propagating in the incident direction and beams propagating in the reflected direction, the incompatibility a result of the polarization shift introduced by the quarter wave plate. Referring to FIG. 3A, a horizontal linear polarized object beam 1002 interferes with a horizontal polarized reference beam 1004 in recording medium 1009. The object beam and reference beam propagate through quarter waveplate 1010 and are reflected by reflective substrate 1011, resulting in a reflected object beam 1006 having a vertical polarization and a reflected reference beam 1008 having a vertical polarization, the polarization shift resulting from the quarter waveplate 1010. The reflected object beam propagates back towards the polarizing beam splitter 1014, which is configured to deflect vertical polarized light. The reflected object beam deflects off the diagonal interface of the polarizing beam splitter cube 1014 to the camera 1016, allowing the object beam to be imaged and data encoded in the object beam to be detected and verified with the data provided to the pattern encoder.

Figure 3B:
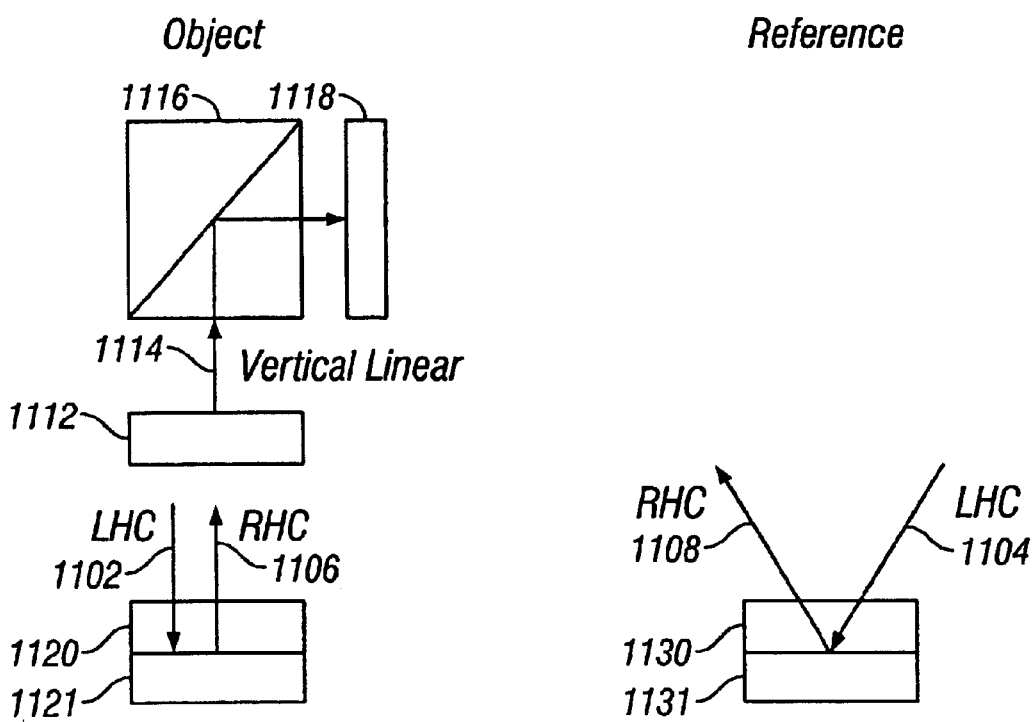
FIG. 3B is an illustrative drawing demonstrating object beam and reference beam circular polarizations during a record process.

The quarter wave plate is not necessary when the incident object and reference beams are circularly polarized. If the incident polarization of the reference or object beam is circular, a ninety degree rotation occurs upon reflection off the mirrored surface of a reflective substrate. Thus, an incident left banded circular polarization beam to a reflective substrate becomes a right handed circularly polarized beam upon reflection, and an incident right handed circular polarization becomes left handed circularly polarized upon reflection. Referring to FIG. 3B, a left handed circular polarized object beam 1102 interferes with a left handed circular polarized reference beam 1104 in recording medium 1120. The reflected object beam 1106 has a right handed circular polarization and the reflected reference beam 1108 has a right handed circular polarization, the polarization shift resulting from a reflective substrate 1121. In configurations where the polarizing beam splitter cube 1116 deflects linear polarized light, a waveplate or variable waveplate 1112 is inserted in the path between the polarizing beam splitter and holographic storage media to convert the reflected object beam 1106 to linear polarized light. Thus, the linear polarized reflected object beam 1114 is deflected off the diagonal interface of the polarizing beam splitter 1116 to a camera 1118, allowing the object beam to be imaged and data encoded in the object beam to be detected and verified with the data provided to the pattern encoder.

The reference beam and encoded object beam can be horizontal linear, vertical linear, left handed circular, or right handed circular polarizations. Possible combinations for the incident reference beam/incident object beam to interfere in a co-propagating direction include vertical linear/vertical linear, horizontal linear/horizontal linear, left handed circular/left handed circular, and right handed circular/right handed circular.

Figure 8:
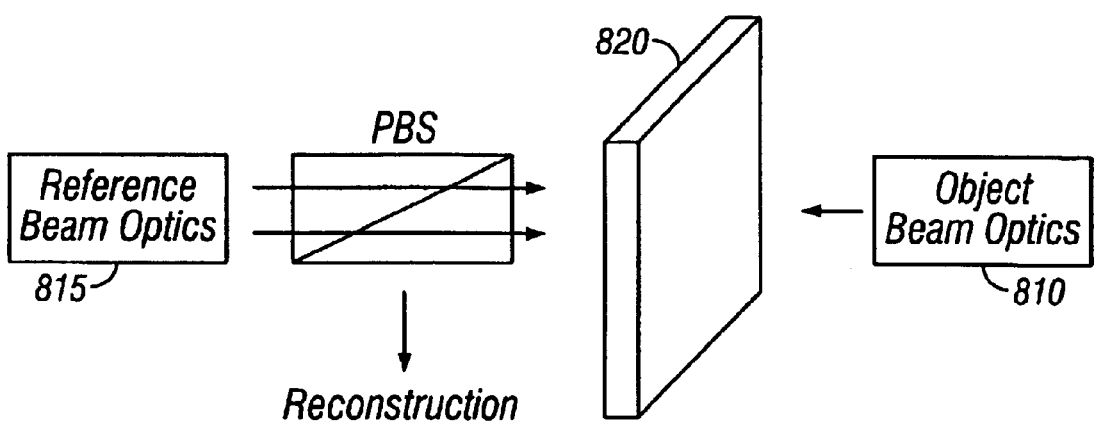
FIG. 8 illustrates a prior art counter-propagating holographic storage system.

In an alternative embodiment, the incident object beam and incident reference beam polarizations are orthogonal. As a result, interference gratings are written only between the beams that are counterpropagating (i.e., the reflected object beam and the incident reference beam interfere, and the incident object and reflected reference beam interfere). The incident object and reference beam do not have compatible polarizations and thus do not interfere coherently in the incident direction. Possible combinations for the reference beam and object beam to interfere in counterpropagating directions are vertical linear/horizontal linear, horizontal linear/vertical linear, right handed circular/left handed circular, and left handed circular/right handed circular. Utilizing an orthogonal incident object beam and incident reference beam in wavelength multiplexed systems offers the advantage of enabling the interference gratings to be written with better Bragg selectivity since the gratings are written in a counter propagating geometry and not a co-propagating geometry. Referring to FIG. 8, a block diagram of a prior art system employing a counter propagating geometry is illustrated. The reference beam and object beam are incident on two opposite faces of the holographic recording medium and counterpropagating. The reconstruction beam is on the same side of the medium as the probe beam in this prior art system. A beam splitter separates the reconstruction from the probe. The counter propagating geometry has been preferred in wavelength multiplexed systems because it provides optimal wavelength Bragg selectivity.

Figure 3C:
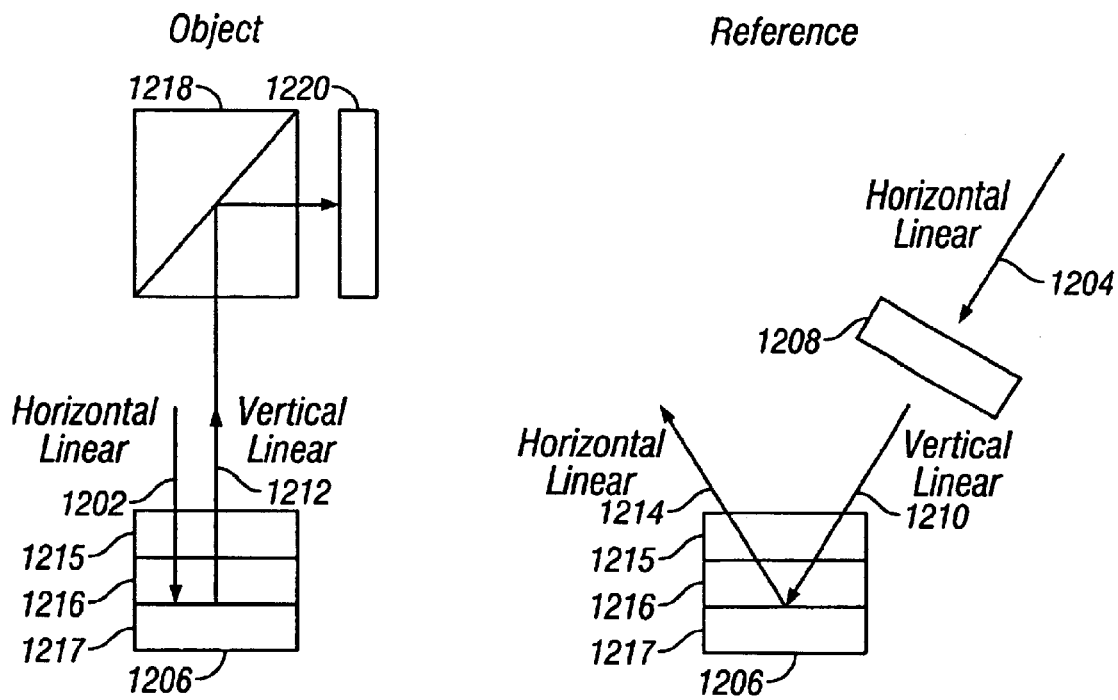
FIG. 3C is an illustrative drawing demonstrating object beam and reference beam polarizations in a counterpropagating configuration during a record process.

In the present invention, a counter propagating geometry is utilized whereby all the optics are on one side of the holographic storage medium, with counterpropagating interference produced by altering the polarization combinations of the object beam and reference beam. Thus, as described above, which beams write gratings and which do not are determined by selecting the proper polarization combination. The polarization of either the incident reference beam or incident object beam can be altered so that the two beams do not have compatible polarizations by placing polarization altering devices such as quarter waveplates or half waveplates in the path of the incident object beam or reference beam. Referring to FIG. 3C, a horizontal polarized object beam 1202 and horizontal polarized reference beam 1204 are directed at a holographic storage media 1206. Holographic storage media 1206 comprises a recording medium 1215, a quarter waveplate 1216, and reflective substrate 1217. A half wave plate 1208 is inserted in the path of the reference beam 1204 for conversion to a vertical polarized reference beam 1210. The reflected object beam 1212 has a vertical polarization and the reflected reference beam 1214 has a horizontal polarization, resulting in counterpropagating interference with the polarization shift resulting from the quarter waveplate 1216. The reflected object beam propagates back towards the polarizing beam splitter 1218, which is configured to deflect vertical polarized light. The reflected object beam deflects off the diagonal interface of the polarizing beam splitter cube 1218 to the camera 1220, allowing the object beam to be imaged and data encoded in the object beam to be detected and verified with the data provided to the pattern encoder.

Referring to FIG. 1, the present invention utilizes a moving assembly 185 to achieve shift multiplexing. Multiplexing is achieved by shifting (translating) the recording medium with respect to the signal and reference beams. Preferably, the previously described recording process is implemented by the shift servo 190 under the control of the control electronics 170. Specifically, the control electronics 170 causes the shift servo 190 to translate the moving assembly 185 to a first position, at which time the control electronics 170 causes the pattern encoder 155 to transmit a first image on the object beam 125. The image is then recorded on the holographic storage media 150. Thereafter, the shift servo 190 shifts the holographic storage system by a displacement delta. Thereafter, the control electronics 170 causes the pattern encoder 155 to transmit the next image on the object beam 125. The shift and record process is then repeated.

In alternative embodiments, shift multiplexing can be implemented without mechanical motion of the holographic storage media 150. Relative motion may be produced by movement of the medium, or by tandem movement of the object and reference beams. Such movement of the object and reference beams is equivalent to physical movement of the holographic storage media 150. Alternative to movement of the beam by movement of the laser light source and all optical elements, beam movement may take the form of a variety of forms of "beam steering", in which only a part of the optical train associated with the relevant beam is changed-by physical motion, by introduction of an additional element, etc. In one alternative embodiment, beam steering can be implemented using a mirror. A mirror can be used to change the angle of the plane wave illuminating the reference beam lens 135 shown in FIG. 1. The focal point of the lens 135 shifts monotonically with the angle of the mirror over a limited angular range determined by the aperture of lens 135.

In a further alternative embodiment, beam steering can be implemented using an acousto-optic beam deflector. The acousto-optic deflector deflects light by the acoustic wave inside a crystal such as tellurium dioxide. The acousto-optic deflector offers high speed modification of the deflection angle, typically on the order of 1 microsecond, allowing for extremely rapid random access to any hologram position. In a further alternative embodiment, reference beam lens 135 shown in FIG. 1 can be shifted in the transverse direction to the optical axis to alter the reference spherical wave effective origin, the focal point F. In a further alternative embodiment, a single-mode polarization-preserving fiber is used to replace the reference beam lens 135. The end of the fiber serves as the origination point of the reference spherical wave. The design and end surface of the fiber determine the numerical aperture properties of the reference beam. Shift multiplexing is achieved by mechanical translation of the fiber end.

Figure 1A:
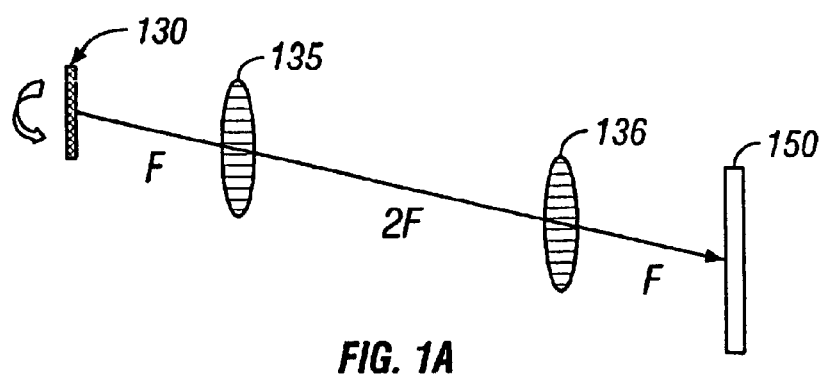
FIG. 1A illustrates a 4-F configuration of certain optical elements shown in FIG. 1 used to implement angular multiplexing.

The system of FIG. 1 can be modified to implement angular multiplexing with the holographic storage media 150. An additional lens 136 is inserted between mirror 130 and the holographic storage media 150, and mirror 130 is rotatable. Referring to FIG. 1A, mirror 130 is a rotatable beam deflector used in conjunction with imaging lens 135 and 136 to scan the angle of the reference beam to implement angular multiplexing. Mirror 130, lens 135, lens 136, and the photorecording medium 150 are in a 4-F configuration: lens 135 and 136 are separated by the sum of their focal lengths, with two dimensional input and output planes located one focal length in front of the lens pair at the mirror 130 and one focal length behind the lens pair at the photorecording medium 150. As mirror 130 rotates, the angle of reference beam 120 reflecting from the mirror 130 changes, resulting in a change of the angle of incidence of the reference beam at the photorecording medium 150 changes while the location remains the same. During recording, the reference beam is scanned through all reference angles. Angle multiplexing can be implemented on either side of the normal to the holographic storage media. For example, in FIG. 4, beam 416 can be a record reference beam that is scanned through a series of reference angles in addition to reference beam 402. Angle multiplexing can be implemented in conjunction with shift multiplexing with the system of FIG. 1 and any other embodiment described herein in which shift multiplexing is utilized.

The reflective holographic storage system of the present invention increases the hologram interaction length due to interference of the object and reference beam in both the incident and reflected direction. The reflective holographic storage system of the present invention reduces the amount of displacement required during shift multiplexing to extinguish reconstruction of the hologram prior to recording of the next hologram for a given thickness. The amount of displacement required is inversely proportional to the thickness of the recording medium, and the thickness dimension is essential for Bragg selectivity. Shift holography provides for high density packing of successive holograms. Overlapping holograms produced by shifting the medium are differentiated by Bragg selectivity, but have required thick recording mediums in the prior art. By utilizing the photopolymer layer to record a hologram in both an incident direction and reflected direction, the thickness of the photopolymer can be reduced for a given displacement or the displacement can be reduced for a given thickness of the photopolymer material. Other factors affecting photopolymer thickness include the wavelength of the light beam, numerical aperture of the reference lens, as well as the distance the focal point is from the storage media. In one embodiment, the amount of the shift required to extinguish reconstruction of the hologram is approximately five microns for a photopolymer thickness of about 800 microns.

Angular multiplexing provides for storage of multiple holograms in the same volume which are differentiated by Bragg selectivity. The reflective holographic storage system of the present invention reduces the amount of the change of the reference angle required during angle multiplexing to extinguish reconstruction of the hologram prior to recording of the next hologram. The increased hologram interaction length increases the angular selectivity of the media for a given thickness, thereby increasing the storage capacity. The amount of displacement required is inversely proportional to the thickness of the recording medium, which is essential for Bragg selectivity. By utilizing the photopolymer layer to record a hologram in both an incident direction and reflected direction, the thickness of the photopolymer can be reduced for a given reference angle change or the reference angle change can be reduced for a given thickness of the photopolymer material.

In a preferred embodiment, control electronics 195 synchronizes the spatial light modulator 155 with the moving assembly 185 during shift multiplexing. Control electronics 175 may include a processor and memory containing instructions for storing and retrieving data. A selected one of the shift multiplexed holograms thus recorded in the reflective holographic storage media 150 is reconstructed or projected onto the detector 180 using the same procedure described above, except that only the reference beam is projected onto the reflective holographic storage system 150 as shown, the object beam being blocked or turned off by the spatial light modulator 155.

Referring to FIG. 3 during readout of holograms previously stored in the holographic storage media 350, object beam 325 is blocked from transmission and a readout reference beam (also referred to as a probe beam in the readout process) is projected at the same angle to the same spot on the holographic storage medium on which the desired information was previously stored. As reference beam 320 intersects holographic storage medium 350 it passes through the photopolymer layer 326 at an incident direction and is reflected off the reflective substrate 322 and passes through the photopolymer layer 326 in a reflected direction. Reflective substrate 322 reflects the reference beam 320 so that it re-traces the recording reference beam. Diffraction of the reference beam with the previously stored hologram in both the incident and reflected direction generates a reconstruction beam 382 that reconstructs the previously stored hologram. The reconstructed beam is transmitted towards imaging lens 380, which is also used to image the object lens during the record process. Imaging lens 380 directs and images the reconstruction beam onto the plane of the camera 354 by propagating the reconstruction beam to a polarizing beam splitter 352 which deflects the beam onto the optical detector 354. Optical detector 354 may be of conventional construction, for example a conventional photodiode array or other suitable detector array that transforms the encoded page into digitized data. Referring to FIG. 1, shift servo 190 under control of control electronics 170 shift the moving assembly 185 as successive holograms are reconstructed.

Figure 3D:
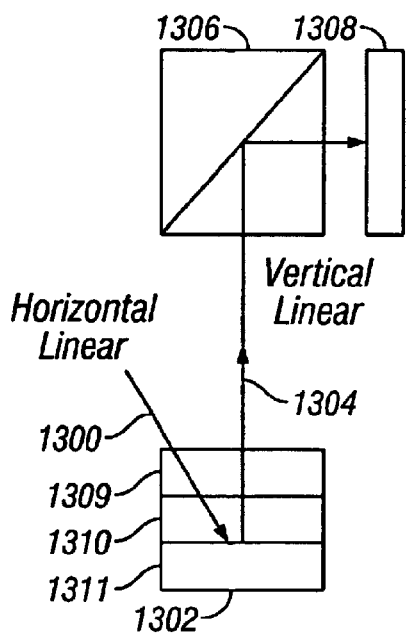
FIG. 3D is an illustrative drawing demonstrating a linearly polarized readout reference beam.

During readout, the incident readout reference beam can be of any polarization regardless of the polarization of the encoded object beam and reference beam used to record the hologram. However, the polarization of the reference beam with the reconstructed image must be of a polarization when it reaches the polarizing beam splitter such that the polarizing beam splitter deflects the readout reference beam onto the camera. The required polarization at the polarizing beam splitter is dependent on the relative position of the spatial light modulator, camera, polarizing beam splitter, and readout reference beam. Polarization of the readout reference beam can be altered prior to the polarizing beam splitter by additional quarter waveplates, half waveplates, variable waveplates, or other polarization shifting devices anywhere in the path of the readout reference beam in addition to any shift caused by a quarter waveplate or the reflective substrate of the holographic storage media to produce the required polarization for the polarizing beam splitter to deflect the readout reference beam to the camera. In a preferred embodiment, the polarizing beam splitter 352 deflects linear polarized light. In the readout process of the preferred embodiment, the reference beam 320 is a linear polarization with a proper orientation so that after propagating through the quarter wave plate, the reconstruction beam is of a polarization that will be reflected by the beam splitter 352 towards the camera 354. Referring to FIG. 3D, a horizontal linear polarized readout reference beam 1300 is directed at a storage medium 1302 with recording medium 1309, quarter waveplate 1310, and reflective substrate 1311, resulting in a reflected reference beam 1304 with a vertical linear polarization. Polarizing beam splitter 1306 is configured to deflect vertical linear polarized light. Thus, the reflected reference beam 1304 is deflected to a camera 1308.

Figure 3E:
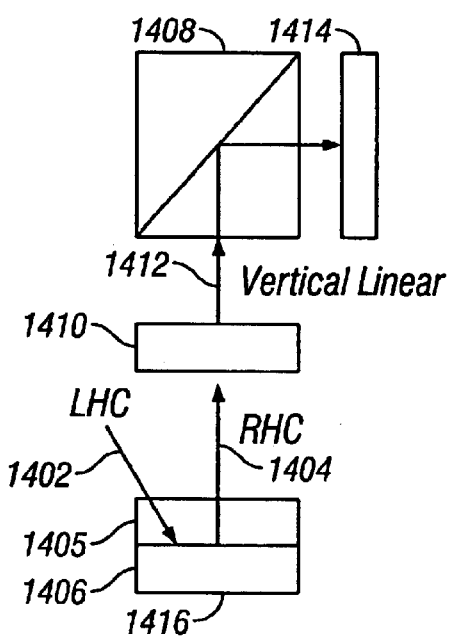
FIG. 3E is an illustrative drawing demonstrating a circularly polarized readout reference beam.

In an alternative embodiment, the readout reference beam may initially be circular polarized that is shifted to the required linear polarized light by polarization shifting devices prior to reaching the polarizing beam splitter. Referring to FIG. 3E, a left handed circular polarized readout reference beam 1402 is directed at a storage media 1416 comprising recording medium 1405 and reflective substrate 1406. The reflected reference beam 1404 has a right handed circular polarization the polarization shift resulting from the reflective substrate 1406. In configurations where the polarizing beam splitter 1408 deflects vertical linear polarized light, a quarter waveplate 1410 is inserted in the path between the polarizing beam splitter 1408 and storage media 1416 to convert the reflected reference beam 1404 to vertical linear polarized light 1412. Thus, the reflected reference beam 1412 is deflected off the diagonal interface of the polarizing beam splitter 1408 to a camera 1414.

One aspect of the present invention allows for simplified record and readout optics since the reconstruction retraces the path of the object beam during recording. In addition, the present invention eliminates the need for a separate readout lens to image the reconstructed beam onto a camera. The separate readout lens of the prior art adds additional cost and complexity to the holographic storage system. The lens 380 used in imaging the encoded object beam is reused to image the reflected reconstruction beam. Thus, the present invention improves the compactness, cost, and weight of holographic storage systems.

Figure 4:
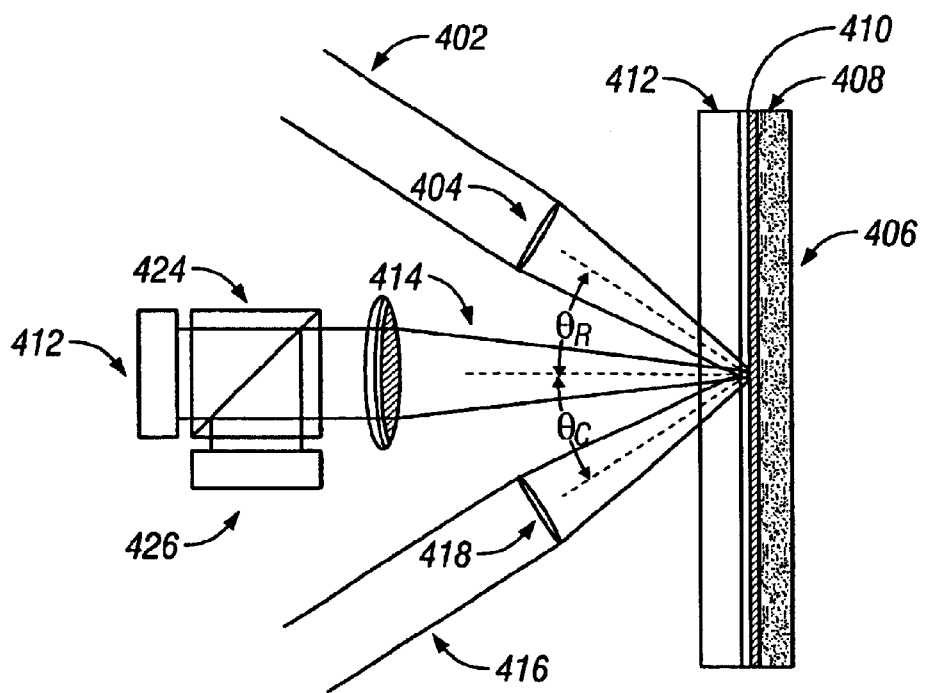
FIG. 4 illustrates a phase conjugate geometry embodiment of the present invention.

Referring to FIG. 4, a further embodiment of the present invention is illustrated utilizing a phase conjugate geometry. Phase conjugate geometries are discussed in "Volume Holographic Multiplexing Methods", by G. Barbastathis and D. Psaltis, published in Holographic Data Storage. pages 22–59, by H.J. Coufal, D. Psaltis, and G.T. Sincerbox, Eds., copyright 2000, Springer-Verlag. Phase conjugate systems offer the advantage that reconstruction can be obtained with fewer or lower quality imaging elements. There are also examples where no lenses are required. This allows for cheaper and more compact systems. Similar to FIG. 1, light generated by laser light source is directed to a beam splitter which splits the light from laser light source into a reference beam and an object beam. Reference beam 402 is propagated to a lens 404, which images the reference beam onto a reflective holographic storage media 406. Holographic storage media 406 comprises a reflective substrate 408, a photopolymer layer 410, and a protective substrate 412. In the phase conjugate geometry, the holographic storage media does not include a quarter waveplate. The focal point F of lens 404 is at the intersection of photopolymer layer 410 and reflective substrate 408. The object beam is propagated to a spatial light modulator 412 which encodes the object beam 414 with data. The object beam is then directed normal to a reflective holographic storage media 406 without the need for imaging optics. A high quality imaging lens 180 shown in FIG. 1 is not required between the spatial light modulator 412 on holographic storage media and the encoded object beam propagates freely to the reflective holographic storage media 406. Alternatively, a lower quality lens may be used in the place of high quality imaging lens 180 to ensure an appropriate object beam spotsize at the storage media.

Spatial light modulator 412 may be illuminated with a converging beam such that the encoded object beam is converging in order to reduce the spot size on holographic storage media. Interference between the reference beam and the encoded object beam in the photopolymer layer 410 records a hologram. Both reference beam 402 and encoded object beam 414 propagate through the photopolymer layer 410 at an incident direction to the reflective substrate 408. At the reflective substrate 408, the reference beam and encoded object beam are reflected back through the photopolymer layer 410 in a reflected direction opposite to the incident direction prior to reflection. Interference between the reflected reference beam and reflected encoded object beam in the photopolymer layer 410 records a hologram. Shift multiplexing techniques described above can be utilized to record successive holograms. Alternatively, other multiplexing techniques such as angle, peristrophic, correlation, or phase multiplexing can be utilized.

During readout, a reference beam 416 which is a phase conjugate of the reference beam 402 is used to reconstruct the previously recorded hologram. Reference beam 416 is propagated to a lens 418. In order for reference beam 416 to be a phase conjugate of reference beam 402, the incident angle the focal point F of lens 418 is at the same point as lens 404 at the intersection of photopolymer layer 410 and reflective substrate 408, and the incident angle $\theta_c$ 420 of reference beam 416 measured from the normal to the media from the focal point F is equal to the incident angle $\theta_r$ 422 of reference beam measured from the normal. Reference beam two produces a distortion-free image at the location of the original signal. The phase conjugated reconstruction beam is propagated to the polarizing beam splitter 424, which deflects the reconstruction beam to the camera 426. The present invention allows for phase conjugate reconstruction with the phase conjugate reference beam 418 on the same side of the holographic storage media 406 as the recording reference beam 402.

Figure 5:
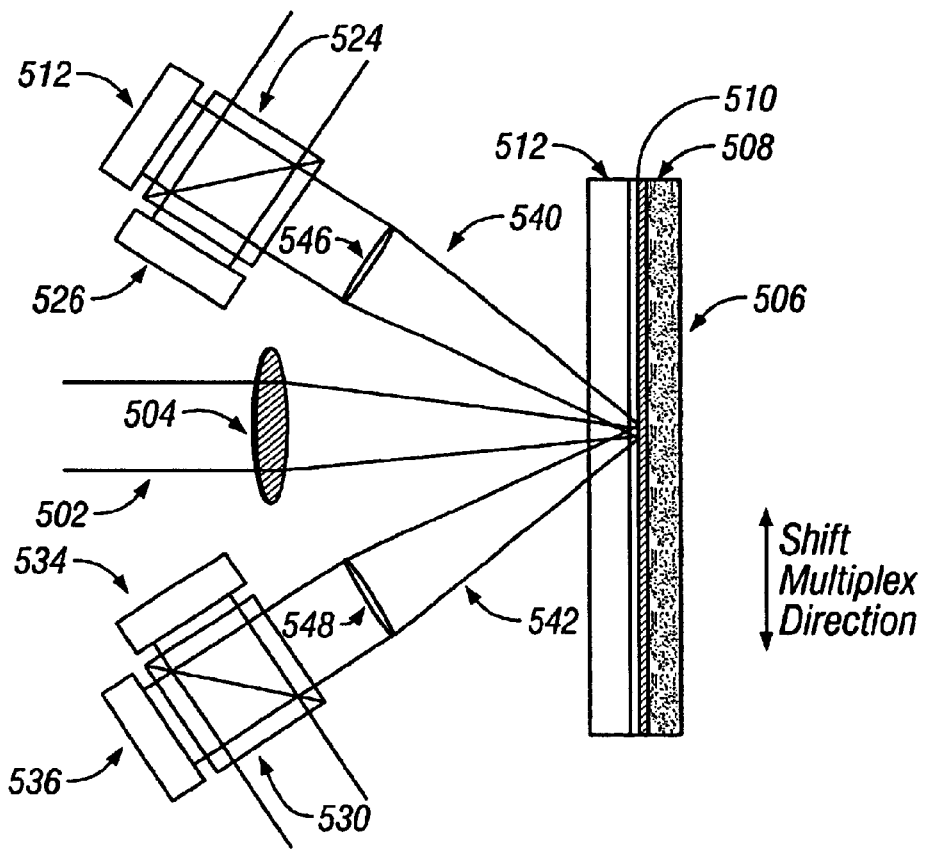
FIG. 5 illustrates a further embodiment of the phase conjugate geometry.

Referring to FIG. 5, a further embodiment of a phase conjugate geometry is illustrated utilizing two object beams to simultaneously record two different holograms. Similar to FIG. 1, light generated by laser light source is directed to a beam splitter which splits the light from laser light source into a reference beam and a first object beam. This first object beam is further split into a second object beam utilizing a beam splitter. In this embodiment, a reference beam 502 is incident normal to the holographic storage media, and thus will also serve as its own phase conjugate during reconstruction. Reference beam 502 is propagated to a lens 504, which images the reference beam onto a holographic storage media 506. Holographic storage media 506 comprises a reflective substrate, 508 a photopolymer layer 510, and a protective substrate 512.

A first object beam is propagated to a first spatial light modulator 512 which encodes the first object beam with a first set of data. Simultaneously, a second object beam is propagated to a second spatial light modulator 530 which encodes the second object beam with a second set of data. Both object beam 540 and object beam 542 are incident to holographic storage media at an angle. In an alternate embodiment, only one object beam is utilized, with the reconstruction beam reflected off the reflective substrate away from the originating spatial light modulator to a camera. The first object beam and the second object beam are directed to a reflective holographic storage media 506 without the need for imaging optics and each object beam propagates freely to the reflective holographic storage media 506. Spatial light modulator 512 and Spatial light modulator 536 may be illuminated with a converging beam such that the respective encoded object beams are converging in order to reduce the spot size on holographic storage media. Alternatively, a lens 546 and 548 could be used to image the object beams to reduce the spot size. Lens 546 and 548 need not be of the same quality as that used in a non-phase conjugate system. Interference between the reference beam and the first and second encoded object beam in the photopolymer layer 510 simultaneously writes two independent gratings. Both reference beam 502 and the first and second encoded object beam propagate through the photopolymer layer 510 at an incident direction to the reflective substrate 508.

At the reflective substrate 508, the reference beam and the first and second encoded object beam are reflected back through the photopolymer layer 510 in a reflected direction opposite to the incident direction prior to reflection. Interference between the reflected reference beam and reflected encoded object beams in the photopolymer layer 510 record holograms. Object beam 540 is reflected towards SLM 536 and object beam 542 is reflected towards SLM 512. The reflected object beams 542 and 540 are deflected away from the spatial light modulators onto camera 526 and camera 534 respectively during the record process, allowing each object beam to be imaged and the data encoded in each object beam to be detected. The polarization of object beam 540 does not have to be shifted prior to being deflected to camera 534 and the polarization of object beam 542 need not be shifted prior to being deflected to camera 526. In the preferred embodiment, the record reference beam is either 100% horizontal linear or vertical linear polarized, and the object beams 540 and 542 are the same polarization as the reference beam. In an alternative embodiment, the reference beam is 50% horizontal linear and 50% vertical linear. Object beam 540 is horizontal linear and object beam 542 is vertical linear. In this embodiment, each object beam interferes with a portion of the reference beam, but not with each other. Shift multiplexing techniques described above can be utilized to record successive holograms. Alternatively, other multiplexing techniques such as angle, peristrophic, correlation, or phase multiplexing can be utilized.

During readout, a reference beam which is a phase conjugate of the record reference beam 502 is used to reconstruct the previously recorded hologram. Reference beam 502 is propagated to a lens 504 which directs the reference beam to the holographic storage media at an incident angle normal to the holographic storage media surface where it is reflected by reflective substrate 508. The reflected reference beam is the phase conjugate of incident reference beam. The phase conjugate readout reference beam is diffracted towards the object beam originating spatial light modulator 512 and 536, and deflected by polarizing beam splitter 524 and 530 respectively onto cameras 526 and 534 before reaching the spatial light modulators. The reflected phase conjugate reference beam produces a distortion-free image at the location of the two originating signals. The present invention allows for phase conjugate reconstruction with the phase conjugate reference beam on the same side of the holographic storage medium as the recording reference beam. In addition, fewer lenses are required since imaging lens are not required to image object beam 540 and object beam 542 during the recording process. Lens 504 used to image the reference beam onto the holographic storage media is of high quality, containing as few aberrations and imperfections as possible in order to allow for easier replication of the recording phase front of the recording reference beam in reconstructing the phase conjugate image during readout. In a system not employing phase conjugate readout, polarization of each object beam can be selected so that during readout, the diffracted reconstruction beam is directed to the non-originating spatial light modulator and deflected onto the associated camera.

Figure 6A:
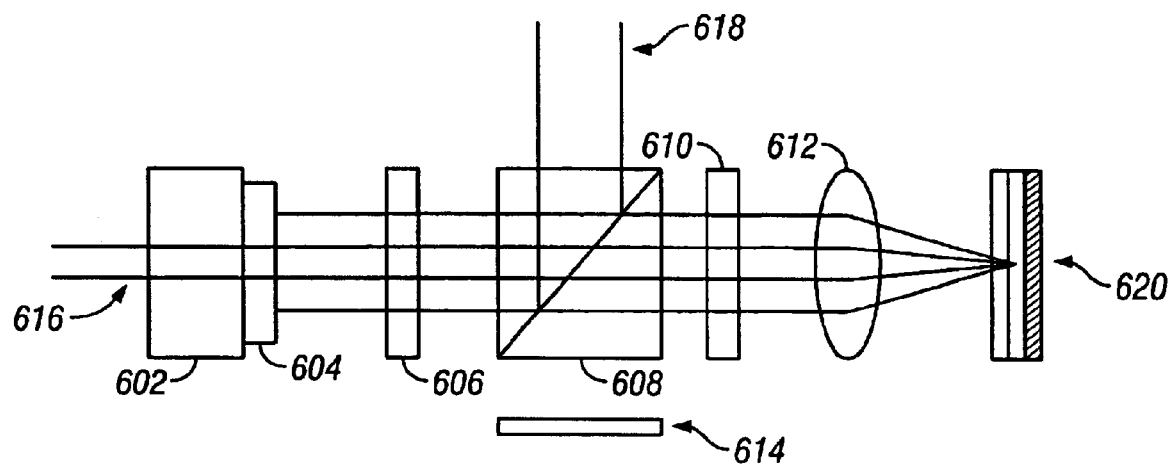
FIG. 6A illustrates an embodiment of the invention in which both the object beam and reference beam are normal to a holographic storage media.

Referring to FIG. 6a, a further embodiment of the present invention utilizing reflective holographic storage with shift multiplexing is illustrated. An encoded object beam and a reference beam are both incident normal to the surface of a holographic storage media 620. The system comprises a laser light source, a spatial light modulator 602, a ring reflection mirror 604, a first quarter wave plate 606, a polarizing beam splitter 608, a second quarter wave plate 610, a lens 612, and a camera 614. The ring reflection mirror is a circular mirror with its interior removed. Spatial light modulator 602 is a rectangular spatial light modulator that is overlaid with the ring reference reflection mirror 604. Alternatively, the ring reflection mirror with hollowed out interior can be placed in the reflection port of the polarizing beam splitter 608. An object beam 616 is encoded with data pattern utilizing SLM 602. The encoded object beam is propagated through the interior of ring reflection mirror 604 at the output of SLM 602. A reference beam 618 is reflected by beam splitter 608 towards ring reflection mirror 604, which reflects the reference beam towards the holographic storage media 612. The encoded object beam with reference beam propagating along the object beam circumference are directed through waveplate 606, waveplate 610, and lens 612 to the holographic storage media 620.

Figure 6B:
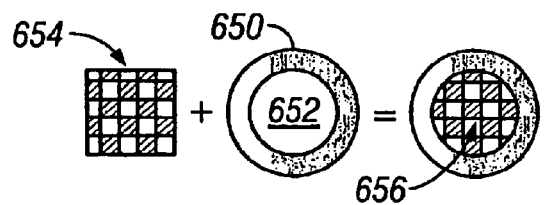
FIG. 6B illustrates hollowed out masks used in the system of FIG. 6A.
Figure 7:
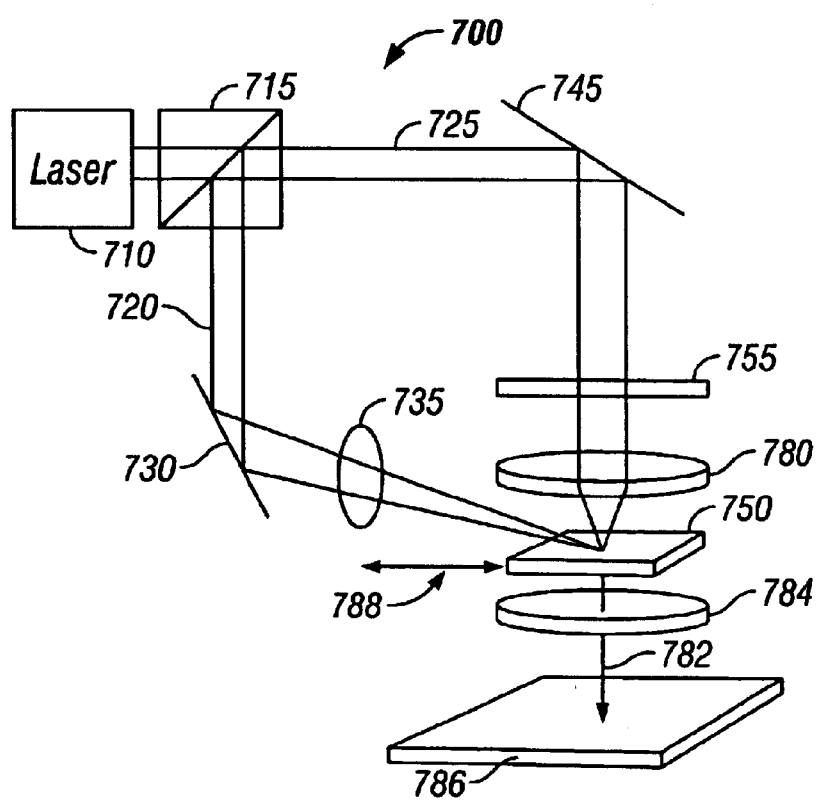
FIG. 7 illustrates a typical prior art holographic storage system.

Referring to FIG. 6B, operation of the ring reflection mirror is shown. A reflection mirror 650 with a hollow interior 652 is overlaid on the output of a rectangular spatial light modulator 654. During recording, the encoded object beam 656 is transmitted through the hollow interior 652 and the reference beam is reflected from reflection mirror 650. Alternative embodiments of the ring reflection mirror a ring quarter wave plate in combination with the ring reflection mirror, a ring diffuser such as a random phase mask with a its interior removed, or a structured phase mask, such as a ring lenslet array with its interior removed. Use of a phase mask or other structured reference source allows correlation multiplexing to be implemented by rotation of the reference beam about the optical axis. In this manner successive holograms could be stored within the same location at the holographic storage media prior to shift multiplexing.

Referring to FIG. 6A, during recording of holograms, the spatial light modulator 602 and ring reflection mirror 604 are illuminated with a circular beam and are both fourier transformed by lens 612 into the holographic storage media 620. The reference beam and object beam occupy different parts of angular space, and interfere within the holographic storage media as if they were propagating through different paths. This embodiment eliminates the need for a separate reference beam path, reducing the associated reference beam optics and allowing for a more compact system. Only one high quality imaging lens is required for both the reference and object beam. This embodiment utilizes the circular nature of the object and reference beam, which lends itself well to the circular plane wave illumination, to match overlap between the object and reference beam. Prior art approaches that utilize a rectangular spatial light modulator throw away much of the useable data due to the overlap mismatch.

Having described the invention in terms of a preferred embodiment, it will be recognized by those skilled in the art that various types of general purpose optical hardware may be substituted for the configuration described above to achieve an equivalent result. For example, the embodiments discussed herein include descriptions of particular optical elements. It will be apparent to those skilled in the art that modifications and variations of the preferred embodiment are possible, and that other optical elements may be used to perform equivalent functions, all of which fall within the true spirit and scope of the invention as measured by the following claims.

What is claimed is:

1. A method of recording successive holograms in a recording medium comprising:

providing a multilayer holographic storage media comprising a reflective substrate layer, a polarization shifting layer disposed above the reflective substrate layer, and a photorecording medium layer disposed above the polarization shifting layer;

propagating a reference beam and an encoded object beam at a first direction to a first area of the photorecording medium layer, wherein the reference beam and encoded object beam have a same first polarization and interfere to produce a first interference grating;

reflecting the reference beam and the encoded object beam with the reflective substrate layer to produce a reflected reference beam and reflected encoded object beam incident the photorecording medium at a second direction, altering the reference beam polarization and the encoded object beam polarization with the polarization shifting layer so that the reflected reference beam and reflected encoded object beam have a same second polarization, wherein the reflected reference beam and the reflected encoded object beam interfere to produce a second interference grating, and wherein the first polarization and second polarization are different; and recording successive holograms by translating the multilayer holographic storage media or reference and object beam along a shift multiplex direction, wherein the reference beam and object beam are propagated to successive areas of the photorecording medium.

2. The method of claim 1, wherein the reflective substrate is a glass substrate with a reflective material deposited on a surface.

3. The method of claim 1, wherein the transparent substrate is a glass, sapphire, polycarbonate, plastic, or quartz material.

4. The method of claim 1, wherein the multilayer holographic storage media further comprises a second photorecording medium layer and a second transparent substrate layer, wherein the second photorecording medium layer is bonded between the reflective substrate layer and the second transparent substrate layer.

5. The method of claim 1, wherein the reference beam and object beam are the same polarization, and are horizontally linear polarized, vertically linear polarized, right hand circular polarized, or left hand circular polarized.

6. The method of claim 1, wherein the reflected object beam propagates to a polarizing beam splitter that deflects the reflected object beam to a detector.

7. The method of claim 1, further comprising recording successive holograms by varying an incident angle of the reference beam to a select area of the photorecording medium layer.

8. A method of recording successive holograms in a recording medium comprising:

providing a multilayer holographic storage media comprising a reflective substrate layer, a polarization shifting layer disposed above the reflective substrate layer, and a photorecording medium layer disposed above the polarization shifting layer;

propagating a reference beam with a first polarization at an incident direction to a first area of the photorecording medium layer, wherein the reference beam is reflected by the reflective substrate and the polarization shifting layer introduces a polarization shift of the incident and reflected reference beam;

propagating a data encoded object beam with a second polarization at an incident direction to a first area of the photorecording medium layer, wherein the object beam is reflected by the reflective substrate and the polarization shifting layer introduces a polarization shift of the incident and reflected object beam;

wherein the incident reference beam and reflected object beam interfere to produce a first interference grating and the reflected reference beam and incident object beam interfere to produce a second interference grating; and recording successive holograms by translating the multilayer holographic storage media or reference and object beam along a shift multiplex direction, wherein the reference beam and object beam are propagated to successive areas of the photorecording medium.

9. The method of claim 8, wherein the object beam and reference beam polarization are orthogonal.

10. The method of claim 8, wherein the reflective substrate is a glass substrate with a reflective material deposited on a surface.

11. The method of claim 8, wherein the transparent substrate is a glass, sapphire, polycarbonate, plastic, or, or quartz material.

12. The method of claim 8, wherein the multilayer holographic storage media further comprises a second photorecording medium layer and a second transparent substrate layer, wherein the second photorecording medium layer is bonded between the reflective substrate layer and the second transparent substrate layer.

13. The method of claim 8, further comprising recording successive holograms by varying an incident angle of the reference beam to a select area of the photorecording medium layer.

14. A method of reconstructing successive holograms previously recorded in a holographic storage medium by providing a multilayer holographic storage media comprising a reflective substrate layer, a polarization shifting layer disposed above the reflective substrate layer, and a photorecording medium layer disposed above the polarization shifting layer;

propagating a reference beam and an encoded object beam at a first direction to a first area of the photorecording medium layer, wherein the reference beam and encoded object beam have a same first polarization and interfere to produce a first interference grating;

reflecting the reference beam and the encoded object beam with the reflective substrate layer to produce a reflected reference beam and reflected encoded object beam incident the photorecording medium at a second direction, altering the reference beam polarization and the encoded object beam polarization with the polarization shifting layer so that the reflected reference beam and reflected encoded object beam have a same second polarization, wherein the reflected reference beam and the reflected encoded object beam interfere to produce a second interference grating, and wherein the first polarization and second polarization are different; and recording successive holograms by translating the multilayer holographic storage media or reference and object beam along a shift multiplex direction, wherein the reference beam and object beam are propagated to successive areas of the photorecording medium, the method of reconstructing comprising:

propagating a probe beam at an incident direction to the first area of the holographic storage media along the same propagation path as the record reference beam, wherein the probe beam propagates through the photorecording medium layer and is reflected by the reflective substrate to produce a reconstruction beam;

wherein the reconstruction beam is directed away from the holographic storage media along the same propagation path as the record object beam to a polarizing beam splitter; and deflecting the reconstruction beam to a detector.

15. The method of claim 14, wherein a polarizing beam splitter deflects the reconstruction beam to the detector and away from the spatial light modulator.

16. The method of claim 14, wherein the reflective substrate is a glass substrate with a reflective material deposited on a surface.

17. The method of claim 14, wherein the transparent substrate is a glass, sapphire, polycarbonate, plastic, or, or quartz material.

18. The method of claim 14, wherein the multilayer holographic storage media further comprises a second photorecording medium layer and a second transparent substrate layer, wherein the second photorecording medium layer is bonded between the reflective substrate layer and the second transparent substrate layer.

19. A method of reconstructing successive holograms previously recorded in a holographic storage medium by providing a multilayer holographic storage media comprising a reflective substrate layer, and a photorecording medium layer disposed above the reflective substrate layer;

propagating a reference beam at a record incident angle with respect to the normal to the holographic storage media and direction through a first imaging lens to a first area of the photorecording medium layer, wherein the reference beam is reflected by the reflective substrate, wherein the focal point of the first lens is at the intersection between the photorecording medium layer and the reflective substrate;

propagating a data encoded object beam from a spatial light modulator at an incident normal direction to a first area of the photorecording medium layer, wherein the object beam is reflected by the reflective substrate;

wherein the incident reference beam and incident object beam interfere to produce a first interference grating and the reflected reference beam and reflected object beam interfere to produce a second interference grating; and recording successive holograms by translating the multilayer holographic storage media or reference and object beam along a shift multiplex direction, wherein the reference beam and object beam are propagated to successive areas of the photorecording medium, the method of reconstructing comprising:

propagating a phase conjugate probe beam at a reconstruct incident angle measured with respect to the normal to the holographic storage media and direction through a second lens to the first area of the holographic storage media, wherein the reconstruct incident angle is equal to the record incident angle but on an opposite side of a normal to the holographic storage media, wherein the probe beam is reflected by the reflective substrate to produce a reconstruction beam, wherein the focal point location of the second lens is equal to the focal point location of the first lens;

wherein the reconstruction beam is directed away from the holographic storage media along the same propagation path as the record object beam through the imaging lens to a polarizing beam splitter; and deflecting the reconstruction beam to a detector.

20. A method of reconstructing successive holograms previously recorded in a holographic storage medium by providing a multilayer holographic storage media comprising a reflective substrate layer, and a photorecording medium layer disposed above the reflective substrate layer;

propagating a reference beam at an incident normal direction to the holographic storage media through an imaging lens to a first area of the photorecording medium layer, wherein the reference beam is reflected by the reflective substrate;

propagating a first data encoded object beam from a spatial light modulator at an first incident angle with respect to the normal to the holographic storage media to a first area of the photorecording medium layer, wherein the first object beam is reflected by the reflective substrate;

propagating a second data encoded object beam from a spatial light modulator at a second incident angle with respect to the normal to the holographic storage media to the first area of the photorecording medium layer, wherein the second incident angle is equal to the first incident angle but on an opposite side of a normal to the holographic storage media, wherein the second object beam is reflected by the reflective substrate, wherein the incident reference beam and first object beam interfere to produce a first interference grating and the reflected reference beam and reflected first object beam interfere to produce a second interference grating, and the incident reference beam and second object beam interfere to produce a third interference grating and the reflected reference beam and reflected second object beam interfere to produce a fourth interference grating; and recording successive holograms by translating the multilayer holographic storage media or reference and object beam along a shift multiplex direction, wherein the reference beam and first and second object beam are propagated to successive areas of the photorecording medium, the method of reconstructing comprising:
propagating a phase conjugate probe beam normal to the holographic storage media and direction through a second lens to the first area of the holographic storage media, wherein the probe beam is reflected by the reflective substrate to produce a first and second reconstruction beam;

propagating the first reconstruction beam away from the holographic storage media along the same propagation path as the record first object beam to a first polarizing beam splitter and deflecting the reconstruction beam to a first detector;

propagating the second reconstruction beam away from the holographic storage media along the same propagation path as the record second object beam to a second polarizing beam splitter and deflecting the reconstruction beam to a second detector;

wherein the first spatial light modulator, second spatial light modulator, first detector, and second detector are on a same side of the holographic storage media.

21. A method of recording successive holograms in a recording medium comprising:
providing a multilayer holographic storage media comprising a reflective substrate layer, a polarization shifting layer disposed above the reflective substrate layer, and a photorecording medium layer disposed above a reflective substrate layer;

providing a wave plate ring with a hollow interior; propagating a reference beam at an incident normal direction through the waveplate ring and through an imaging lens to a first area of the photorecording medium layer, wherein the reference beam is reflected by the reflective substrate;

propagating a data encoded object beam from a spatial light modulator through the hollow interior of the waveplate ring at an incident normal direction through the imaging lens to the first area of the photorecording medium layer, wherein the object beam is reflected by the reflective substrate;

propagating the object beam and reference beam in a reflected direction through the photorecording medium layer and transparent substrate in a reflected direction, wherein the incident reference beam and incident object beam interfere to produce a first interference grating and the reflected reference beam and reflected object beam interfere to produce a second interference grating; and recording successive holograms by translating the multilayer holographic storage media or reference and object beam along a shift multiplex direction, wherein the reference beam and object beam are propagated to successive areas of the photorecording medium.

22. The method of claim 21, further comprising recording successive holograms by varying an incident angle of the reference beam to a select area of the photorecording medium layer.

23. A system for recording and reading out holograms in a recording medium comprising:
a multilayer reflective holographic storage media comprising a reflective substrate layer, a polarization shifting layer disposed above the reflective substrate layer, and a photorecording medium layer disposed above a reflective substrate layer, a laser light source for providing a reference beam and an object beam;

a pattern encoder for encoding data on the object beam to produce an encoded object beam, wherein the reference beam and object beam are propagated to the photorecording medium layer during a hologram recording process using associated reference beam and object beam optics;

a detector for receiving a reconstruction beam during a hologram readout process, wherein the detector, pattern encoder, associated object beam optics, and associated reference beam optics are on the same side of the multilayer reflective holographic storage media; and a means for translating the multilayer holographic storage media or reference and object beam along a shift multiplex direction, wherein the reference beam and object beam are propagated to successive areas of the photorecording medium during the hologram recording process.

24. The system of claim 23, wherein the associated object beam and reference beam optics comprise a beam splitter and imaging lens located between the pattern encoder and the multilayer holographic storage media, wherein during the record process the encoded object beam propagates from the pattern encoder through the beam splitter and is imaged onto the holographic storage media by the imaging lens, and during the hologram readout process the reconstruction beam is propagated through the imaging lens and deflected by the beam splitter to the detector.

25. The system of claim 23, wherein the reflective substrate is a glass substrate with a reflective material deposited on a surface.

26. The system of claim 23, wherein the transparent substrate is a glass, sapphire, polycarbonate, plastic, or, or quartz material.

27. The system of claim 23, wherein the multilayer holographic storage media further comprises a second photorecording medium layer.

28. The system of claim 23, wherein the reference beam and object beam are the same polarization, and are horizontally linear polarized, vertically linear polarized, right hand circular polarized, or left hand circular polarized.

29. The system of claim 23, wherein the reflected object beam propagates to a polarizing beam splitter that deflects the reflected object beam to the detector.

30. The system of claim 23, wherein the pattern encoder comprises a spatial light modulator.

31. The system of claim 23, wherein the detector comprises a charge coupled device.

32. The system of claim 23, further comprising a means for varying an incident angle of the reference beam to a select area of the photorecording medium layer.

33. A method of recording a plurality of holograms in a recording medium comprising:
providing a multilayer holographic storage media comprising a reflective substrate layer, a polarization shifting layer disposed above the reflective substrate layer, and a photorecording medium layer disposed above the polarization shifting layer;

propagating a reference beam and an encoded object beam at a first direction to a select area of the photorecording medium layer, wherein the reference beam and encoded object beam have a same first polarization and interfere to produce a first interference grating;

reflecting the reference beam and the encoded object beam with the reflective substrate layer to produce a reflected reference beam and reflected encoded object beam incident the photorecording medium at a second direction, altering the reference beam polarization and the encoded object beam polarization with the polarization shifting layer so that the reflected reference beam and reflected encoded object beam have a same second polarization, wherein the reflected reference beam and the reflected encoded object beam interfere to produce a second interference grating, and wherein the first polarization and second polarization are different; and recording subsequent holograms at the select area by varying the incident angle of the reference beam to the select area of the photorecording medium layer.

34. The method of claim 33, wherein varying the incident angle of the reference beam to the select area of the photorecording medium layer comprises:

propagating the reference beam to a rotatable beam deflector;

rotating the rotatable beam deflector; and propagating the reference beam from the rotatable beam deflector to the select area of the photorecording medium layer.

35. The method of claim 33, wherein the reflective substrate is a glass substrate with a reflective material deposited on a surface.

36. The method of claim 33, wherein the transparent substrate is a glass, sapphire, polycarbonate, plastic, or, or quartz material.

37. The method of claim 33, wherein the multilayer holographic storage media further comprises a second photorecording medium layer and a second transparent substrate layer, wherein the second photorecording medium layer is bonded between the reflective substrate layer and the second transparent substrate layer.

38. A method of recording a plurality of holograms in a recording medium comprising:

providing a multilayer holographic storage media comprising a photorecording medium layer disposed above a reflective substrate layer;

propagating a reference beam with a first polarization at an incident direction and incident angle to a select area of the photorecording medium layer, wherein the reference beam is reflected by the reflective substrate;

propagating a data encoded object beam with a second polarization at an incident direction to a select area of the photorecording medium layer, wherein the object beam is reflected by the reflective substrate;

wherein the incident reference beam and reflected object beam interfere to produce a first interference grating and the reflected reference beam and incident object beam interfere to produce a second interference grating; and recording subsequent holograms at the select area by varying the incident angle of the reference beam to the select area of the photorecording medium layer.

39. The method of claim 38, wherein varying the incident angle of the reference beam to the select area of the photorecording medium layer comprises:

propagating the reference beam to a rotatable beam deflector;

rotating the rotatable beam deflector; and propagating the reference beam from the rotatable beam deflector to the select area of the photorecording medium layer.

40. A system for recording and reading out holograms in a recording medium comprising:

a multilayer reflective holographic storage media comprising a reflective substrate layer, a polarization shifting layer disposed above the reflective substrate layer, and a photorecording medium layer disposed above the polarization shifting layer;

a laser light source for providing a reference beam and an object beam;

a rotatable beam deflector for varying the angle of incidence of the reference beam on the photorecording medium layer;

a pattern encoder for encoding data on the object beam to produce an encoded object beam, wherein the reference beam and object beam are propagated to the photorecording medium layer during a hologram recording process using associated reference beam and object beam optics; and a detector for receiving a reconstruction beam during a hologram readout process, wherein the detector, pattern encoder, associated object beam optics, and associated reference beam optics are on the same side of the multilayer reflective holographic storage media.

41. The system of claim 40, wherein the reflective substrate is a glass substrate with a reflective material deposited on a surface.

42. The system of claim 40, wherein the transparent substrate is a glass, sapphire, polycarbonate, plastic, or, or quartz material.

43. The system of claim 40, wherein the multilayer holographic storage media further comprises a second photorecording medium layer and a second transparent substrate layer, wherein the second photorecording medium layer is bonded between the reflective substrate layer and the second transparent substrate layer.

* * * * *